No. 684,410. Patented Oct. 15, 1901.
J. W. COLLINS.
TRANSPLANTING MACHINE.
(Application filed Apr. 30, 1901.)
(No Model.) 2 Sheets—Sheet 1.
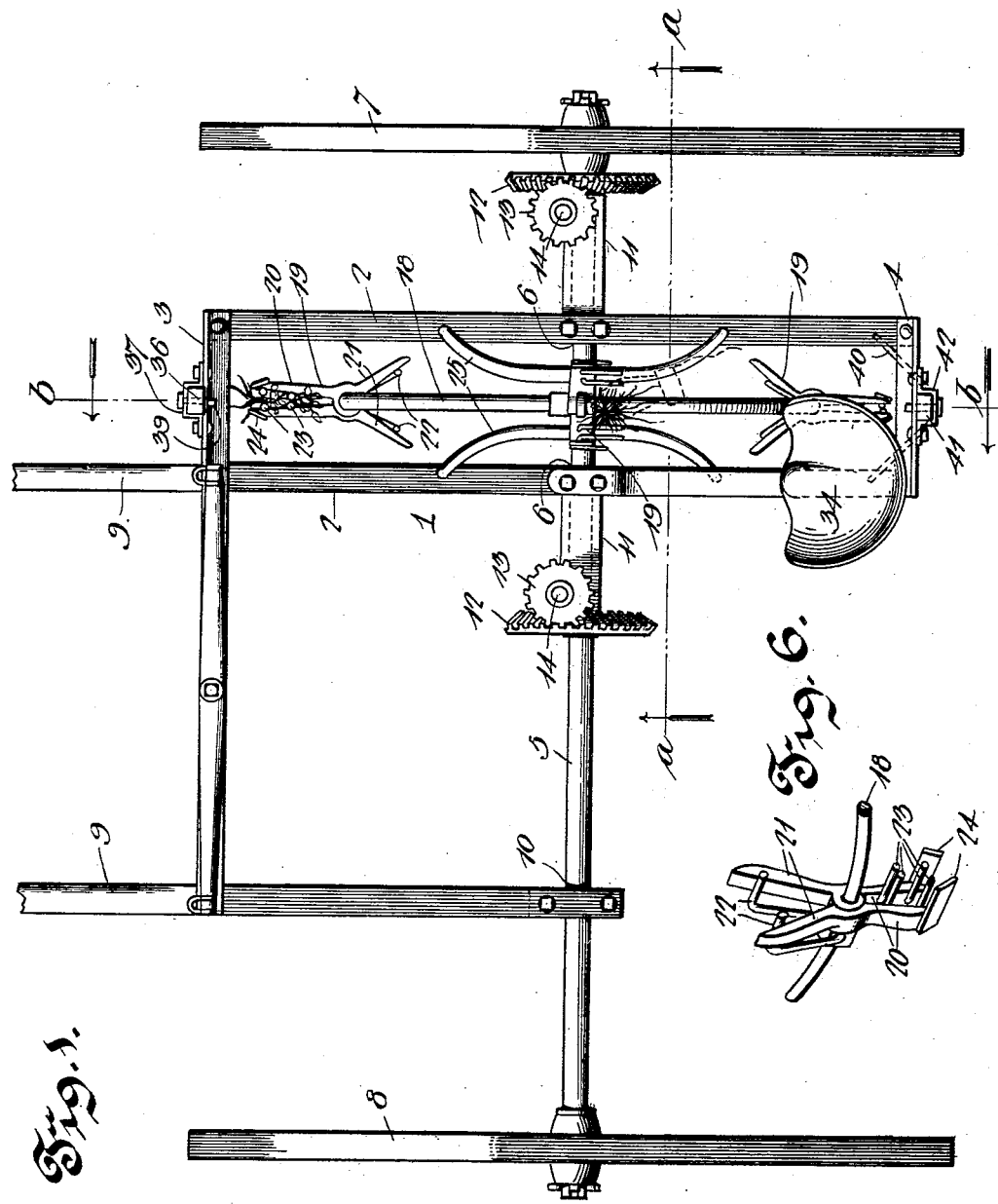
Witnesses
J Frank Calverwell.
J W Garner
John W. Collins, Inventor.
by C A Snow & Co.
Attorneys
THE NORRIS PETERS CO., PHOTO-LITHO., WASHINGTON, D. C.

No. 684,410. Patented Oct. 15, 1901.
J. W. COLLINS.
TRANSPLANTING MACHINE.
(Application filed Apr. 30, 1901.)
(No Model.) 2 Sheets—Sheet 2.
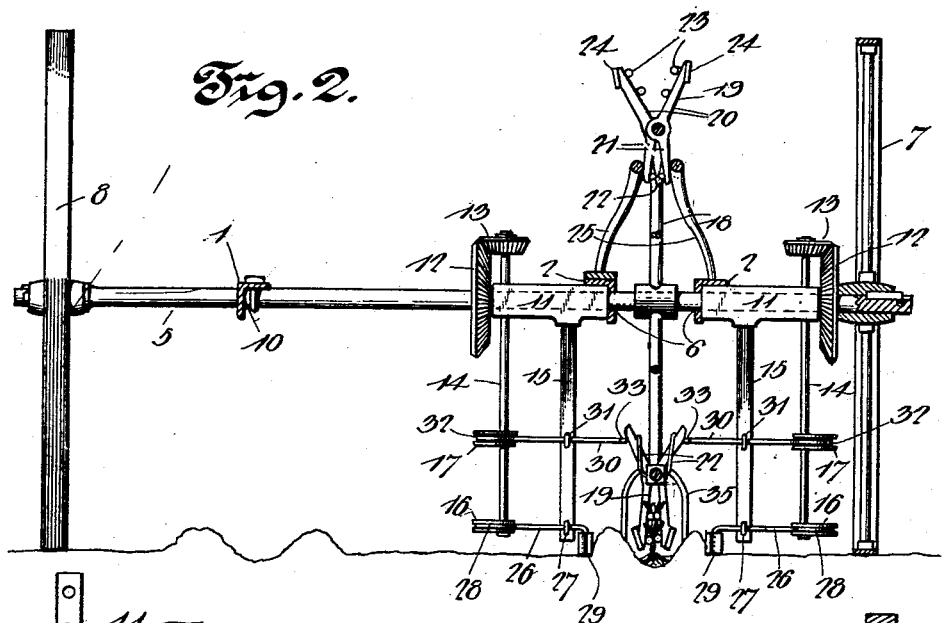
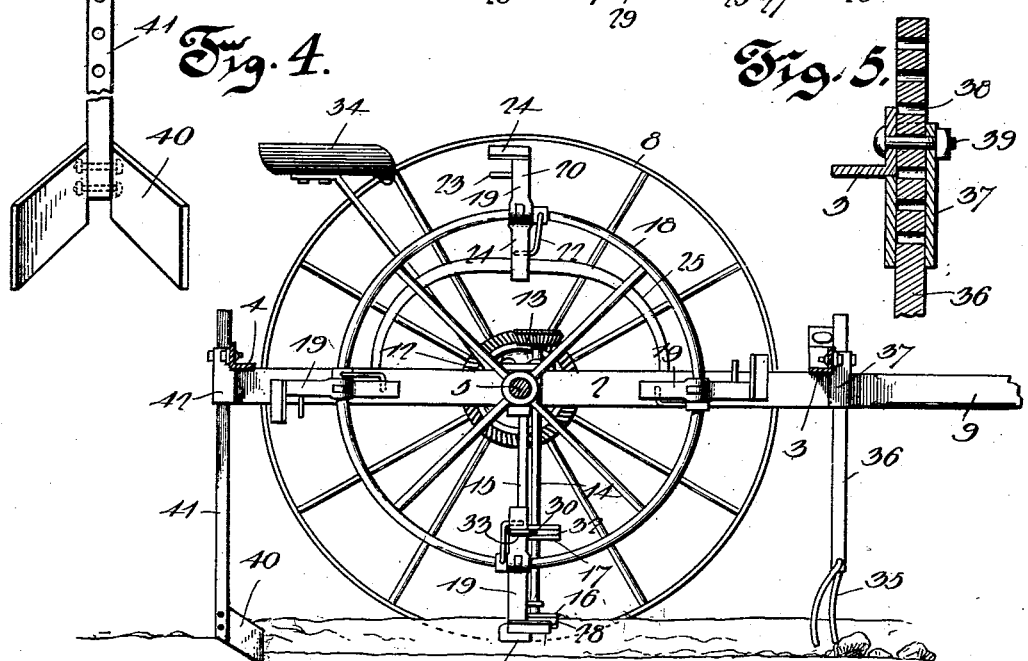
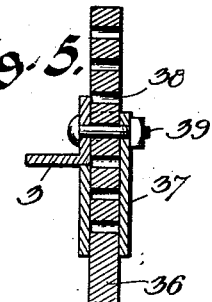
Witnesses John W. Collins, Inventor.
by C. A. Snow & Co.
Attorneys
THE NORRIS PETERS CO., PHOTO-LITHO., WASHINGTON, D. C.

UNITED STATES PATENT OFFICE.

JOHN WILLIAM COLLINS, OF RICHMOND, VIRGINIA.

TRANSPLANTING-MACHINE.

SPECIFICATION forming part of Letters Patent No. 684,410, dated October 15, 1901.

Application filed April 30, 1901. Serial No. 58,201. (No model.)

*To all whom it may concern:*

Be it known that I, JOHN WILLIAM COLLINS, a citizen of the United States, residing at Richmond, in the county of Henrico and State of Virginia, have invented a new and useful Transplanting-Machine, of which the following is a specification.

My invention is an improved transplanting-machine for setting out plants in rows in a field; and it consists in the peculiar construction and combination of devices hereinafter fully set forth and claimed.

In the accompanying drawings, Figure 1 is a top plan view of a transplanting-machine constructed in accordance with my invention. Fig. 2 is a transverse sectional view of the same, taken on a plane indicated by the line $a\,a$ of Fig. 1. Fig. 3 is a vertical longitudinal sectional view of the same, taken on a plane indicated by the line $b\,b$ of Fig. 1. Figs. 4 and 5 are detail views. Fig. 6 is a detail view of one of the clamps.

In the embodiment of my invention I provide a sulky-frame 1, which may be of any suitable construction, but is here shown as composed of a pair of longitudinal side bars 2, a cross-bar 3 connecting them together at their front ends and a cross-bar 4 connecting them together at their rear ends. A revoluble axle-shaft 5 is journaled in suitable bearings 6 in the side bars of said sulky-frame, and on the ends of said axle-shaft are supporting and traction wheels 7 8, which may be either fast or loose thereon and connected thereto by the usual pawl-and-ratchet mechanism to enable the machine to be readily turned and yet cause the axle-shaft to revolve with the supporting-wheels. The sulky-frame is disposed near one end of the axle-shaft. A pair of shafts 9 are attached the one to the sulky-frame and the other directly to the axle-shaft, as at 10. The shafts are disposed centrally with relation to the axle-shaft. A pair of tubular sleeves 11 are attached to the side bars of the frame 1. The axle-shaft rotates in said tubular sleeve and is provided with beveled gear-wheels 12, which are disposed at the outer ends of said tubular sleeves. The said beveled gears rotate with said axle-shaft and engage beveled pinions 13 at the upper ends of vertical shafts 14, which shafts have their bearings in the said sleeves. Hangers 15 depend from the sleeves 11. Each of the shafts 14 has at its lower end an eccentric 16 and is provided at a suitable distance above the eccentric 16 with an eccentric 17.

A wheel 18 or other suitable element is attached to the axle-shaft at a point midway between the side bars of the frame 1 and is rotated by the axle-shaft in a vertical plane. The said wheel or revoluble element 18 carries a series of clamps 19, each of which is provided with a pair of jaws 20 and with arms 21, which extend in an opposite direction from said jaws. The clamps are provided with suitable springs 22, which keep the jaws thereof normally closed. Each of the clamps has its jaws provided with suitable fingers or tines 23 and with blades 24. The tines of the respective jaws of the said clamps are adapted when the jaws are closed to firmly hold a plant between them without injuring the same. The jaws of the clamps project outwardly beyond the periphery of the wheel or revoluble element 18, and the size of said wheel or element is such that the clamps as the same reach the lower side thereof closely approach the ground. On the frame 1, on opposite sides of the wheel 18, are fixed cams 25, which are so constructed and disposed as to engage the arms 21 of each clamp successively as the clamp is carried to the upper side of the wheel 18, press the said arms 21 of the clamp toward each other, and thereby open the jaws thereof in position to have a plant placed between them by the operator who drives the machine.

As the wheel 18 revolves each clamp after having had its jaws opened by the cams 25 is released by said cams as the arms 21 of the clamp pass the said cams, and thereupon the spring 22 of the clamp closes the jaws thereof together on the plant which has been placed between them.

The shafts 14 being geared, as hereinbefore described, to the axle-shaft are also rotated thereby, hence rotating the eccentrics 16 17. Rods 26 operate in guides 27 near the lower ends of the hangers 15 and have their outer ends connected to straps 28 on the eccentrics 16. Hence reciprocating motion is by the said eccentrics communicated to the said rods. The latter at their inner ends are provided with hoes or pressers 29, which are adapted to operate in the soil and to press the same from opposite sides of a furrow into the furrow. Rods 30 operate in guides 31 on the hangers 15, have their outer ends connected to straps 32 on the eccentrics 17, and are provided at their inner ends with suitable heads 33, which operate in the path of the arms 21 of the clamps. The operation of the said reciprocating rods 30 is such that as each of the clamps carrying a plant reaches its lowermost position, proximate to and immediately over the bottom of the furrow, the said arms 30 cause the heads 33 thereof to engage the arms 21 of the clamp and press the said arms together, thereby opening the jaws of the clamp, and hence releasing the plant. The blades 24 of the jaws are disposed as fenders on opposite sides of the plant, and immediately after the latter has been released the eccentrics 16 operate the rods 26 and cause the hoes 39 thereof to move toward each other from opposite sides of the furrow, thereby pressing the soil from the sides of the furrow to the plant and covering the roots thereof, the fender-blades 24 preventing the upper portion of the plant from being covered. Any desired number of the clamps may be used on the wheel 18, according to the diameter of the latter and the distance desired between the plants when set out in the rows. In the drawings I have shown the said wheel 18 as provided with four of the clamps.

The seat 34 for the driver is disposed near the upper side of the wheel 18 and is carried by the frame 1, as shown. A fork or rake 35 operates in the furrow in advance of the wheel or revoluble element 18 and serves to rake clods and stones out of the way of the plants. The standard 36 of the fork or rake is vertically adjustable, its upper portion passes through a sleeve 37 on the front side of the frame 1, is provided with a series of adjusting-openings 38, and is secured in place by a bolt 39, which passes through said sleeve and through one of said openings. A coverer 40, which is preferably of the form shown, operates in rear of the wheel 18. The standard 41 of the coverer is of the same construction as the standard 36 and is vertically adjustable in a sleeve 42.

Having thus described my invention, I claim—

1. In a transplanting-machine, the combination of a frame, an element carried thereby and revoluble in a vertical plane, clamps carried by said revoluble element, means to open the jaws of the clamps successively as the same are lowered, to release plants carried thereby, shafts carried by said frame, on opposite sides of said revoluble element, means to rotate said shafts, eccentrics on said shafts, laterally-movable soil-pressers having rods connected to said eccentrics, and guides for said rods, substantially as described.

2. In a transplanting-machine, the combination of a sulky-frame, a revoluble axle-shaft therefor, supporting-wheels on said axle-shaft, the latter being rotated by the former, an element carried by the axle-shaft and revoluble thereby in a vertical plane, clamps carried by said revoluble element, fixed cams on said frame, adapted to open the jaws of the clamps successively as the same are elevated, vertical shafts geared to and revolved by the axle-shaft, eccentrics in the said vertical shafts, and means operated by said eccentrics to open the jaws of the clamps successively as the same are lowered, thereby releasing the plants carried by said clamps, and to press the soil to the plants, substantially as described.

3. In a transplanting-machine, a revoluble element, a clamp thereon havings jaws provided with fingers to engage and hold a plant between the jaws, and fenders with which the said jaws are provided, in combination with means to open said jaws, thereby releasing the plant, and means to press soil to the latter, the said fenders preventing the top of the plant from being covered, substantially as described.

In testimony that I claim the foregoing as my own I have hereto affixed my signature in the presence of two witnesses.

JOHN WILLIAM COLLINS.

Witnesses:
 ISAAC HELD,
 CHAS. I. PHILIPS.